(12) United States Patent (10) Patent No.: US 8,250,065 B1
Chambers et al. (45) Date of Patent: Aug. 21, 2012

(54) SYSTEM AND METHOD FOR RANKING INFORMATION BASED ON CLICKTHROUGHS

(75) Inventors: Mike Chambers, San Francisco, CA (US); Christian Cantrell, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1262 days.

(21) Appl. No.: 11/139,269

(22) Filed: May 27, 2005

Related U.S. Application Data

(60) Provisional application No. 60/575,232, filed on May 28, 2004, provisional application No. 60/576,387, filed on Jun. 1, 2004.

(51) Int. Cl.
*G06F 7/00* (2006.01)
*G06F 17/30* (2006.01)
(52) U.S. Cl. ........................................................ 707/723
(58) Field of Classification Search .................. 707/723
See application file for complete search history.

(56) References Cited

U.S. PATENT DOCUMENTS

| | | | | |
|---|---|---|---|---|
| 5,247,647 A * | 9/1993 | Brown et al. | ..................... | 714/1 |
| 7,099,871 B2 * | 8/2006 | Faybishenko et al. | ................. | 1/1 |
| 7,240,049 B2 * | 7/2007 | Kapur | ................................... | 1/1 |
| 2003/0093285 A1 * | 5/2003 | Colace et al. | ..................... | 705/1 |
| 2004/0267728 A1 * | 12/2004 | Delic et al. | ......................... | 707/3 |

* cited by examiner

*Primary Examiner* — Van Oberly
(74) *Attorney, Agent, or Firm* — Fish & Richardson P.C.

(57) ABSTRACT

A system and method displays information from a consolidated set of Web log entries or other information. The system and method provides links to the actual information to allow users to view it by clicking the link, and records the number of times users have clicked the link to each entry or other information. The system and method counts the number of click throughs and provides a ranking of each entry it displays that indicates the number of click throughs relative to other entries, such as those in a same category or dealing with a same topic. The system and method displays the date and time of retrieval or storage of the entries by the system and method, adjusted to the user's local time.

15 Claims, 5 Drawing Sheets

SYSTEM AND METHOD FOR RANKING INFORMATION BASED ON CLICKTHROUGHS

CROSS REFERENCE TO RELATED APPLICATIONS

This application claims the benefit of U.S. Provisional Patent Application Ser. No. 60/575,232, entitled, "Method and Apparatus for Ranking Information based on Clickthroughs" filed by Mike Chambers and Christian Cantrell on May 28, 2004, and U.S. Provisional Patent Application Ser. No. 60/576,387, entitled, "Method and Apparatus for Validating Information at a Client Before It Is Sent to a Server" filed by Mike Chambers and Christian Cantrell on Jun. 1, 2004, each having the same assignee as the present application, and each is hereby incorporated by reference in its entirety.

FIELD OF THE INVENTION

The present invention is related to computer software and more specifically to computer software for consolidating information from the Internet.

BACKGROUND OF THE INVENTION

Web logs, also known as "blogs", are provided by many Web sites. To view the various entries on different Web logs is a cumbersome activity because the user must move from Web log to Web log, and much of the information on each Web log is not new, requiring the user to reread some or all of the information before learning that he or she has already, read it.

To allow users to view related Web log entries from a single location, some Web site operators consolidate certain information such as summary information from Web log entries from multiple sites onto a single site. The user can use the single site to browse summary information such as a title and a brief description or first few dozen words, and then, if the user is interested in reading the complete, actual Web log entry, the user can click a link on the consolidated site to the Web log containing the entry so that the user can read the entire actual entry from which the summary information was generated.

Some Web logs are "syndicated" to allow the information from the Web log to be more easily retrieved by consolidators and other. A syndicated Web log is a Web log that is provided in a certain format, such as an XML or XML-like format, like RSS. Other information on the Internet can also be syndicated. The present invention applies to information on the Internet, which may or may not be syndicated, such as Web log information.

However, there can be a large number of entries on a site that consolidates entries. Some entries may have wide appeal to those interested in the topic of the entry, while others can have far more limited appeal. Many users would like to be able to determine those entries that are clicked through to the actual entry most often so that they can more carefully review the summary information of such entries to determine if they too would like to click through to read the actual entry.

If all of the entries on the consolidated site are displayed in the same manner, it makes it difficult for the user to determine which entries are the most popular. Some Web sites that consolidate Web log entries list the number of times that users have clicked through to view the entire Web log entry, but because the number is not displayed relative to other entries, it makes it difficult to determine whether an entry with a certain number of click throughs is popular or not. The user can compare the number of click throughs for one entry with the number of click throughs for other entries displayed nearby, but this technique is not a good way to identify the popularity of the entry relative to other entries in the category. For example, if the other entries nearby have a very low number of clickthroughs, an entry with a low number of clickthoughs can look popular by comparison with its neighbors, when in fact it is not.

In some applications, entries that have been more recently added can be more pertinent than older entries. For example, Web log entries dealing with a news event that deal with a recent development in that event may be far more pertinent than entries that were supplied before the recent development occurred. Thus, when attempting to determine the entries most clicked through as described above, a user may only wish to compare each the number of times users clicked through to an entry that was received within a certain timeframe with the number of times users clicked through to other entries received within that same timeframe. If for example, a hot development that generated a huge number of clickthroughs occurred three days ago, and a more mild development that generated a more moderate number of clickthroughs occurred more recently, a user who frequently visits the consolidate site may wish to see the popularity of each entry received in the last twenty four hours relative to other entries that were received in that period. Comparing the popularity of the more recent entries to those received several days ago would distort the popularity of the more recent entries, making them appear less popular than they really are, relative to the other entries received in the last twenty four hours. Furthermore, older entries can appear more popular than newer ones simply due to the fact that they have been around longer.

What is needed is a system and method that can allow a user to see information, such syndicated information, such as portions of Web log entries, from various Web sites, that users can click through to see more complete information, such as the entire Web log entry, that displays to the user the popularity of the information relative to other related information, such as other Web log entries in the same category or topic, and can display such popularity for entries received in a time or other window relative to other entries received in that same window.

SUMMARY OF INVENTION

A system and method categorizes and displays information consolidated from numerous Web sites, such as summary information from Web log entries, with a link that allows a user to view the actual Web log entry and also allows the system and method to determine that the user has clicked the link. The system and method records the number of click throughs to each of the Web log entries and displays the popularity of each Web log entry relative to other Web log entries in the same category. The system and method may display the popularity of each Web log entry received in a window such as the immediately prior twenty four hours relative to other entries received within this same time window. The system and method may be used for any display of information such as syndicated information consolidated from multiple Web sites.

DETAILED DESCRIPTION OF A PREFERRED EMBODIMENT

Conventional Computer System

Figure 1:
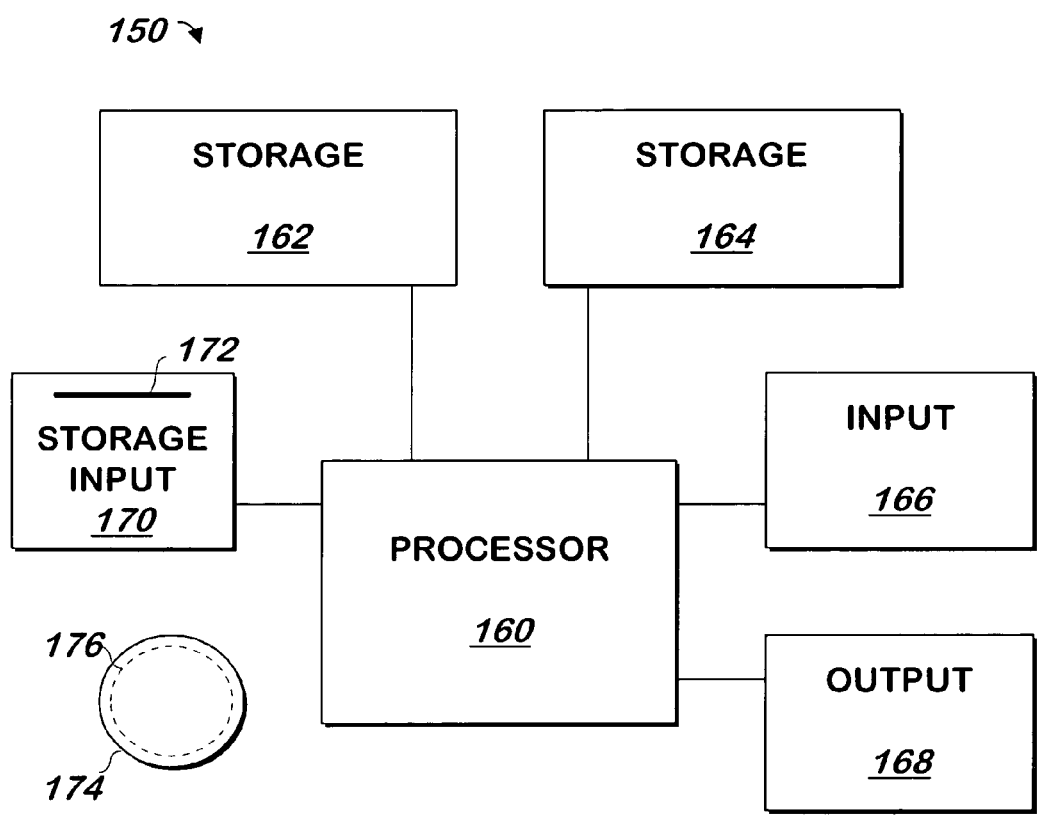
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Communication Interface

Figure 2:
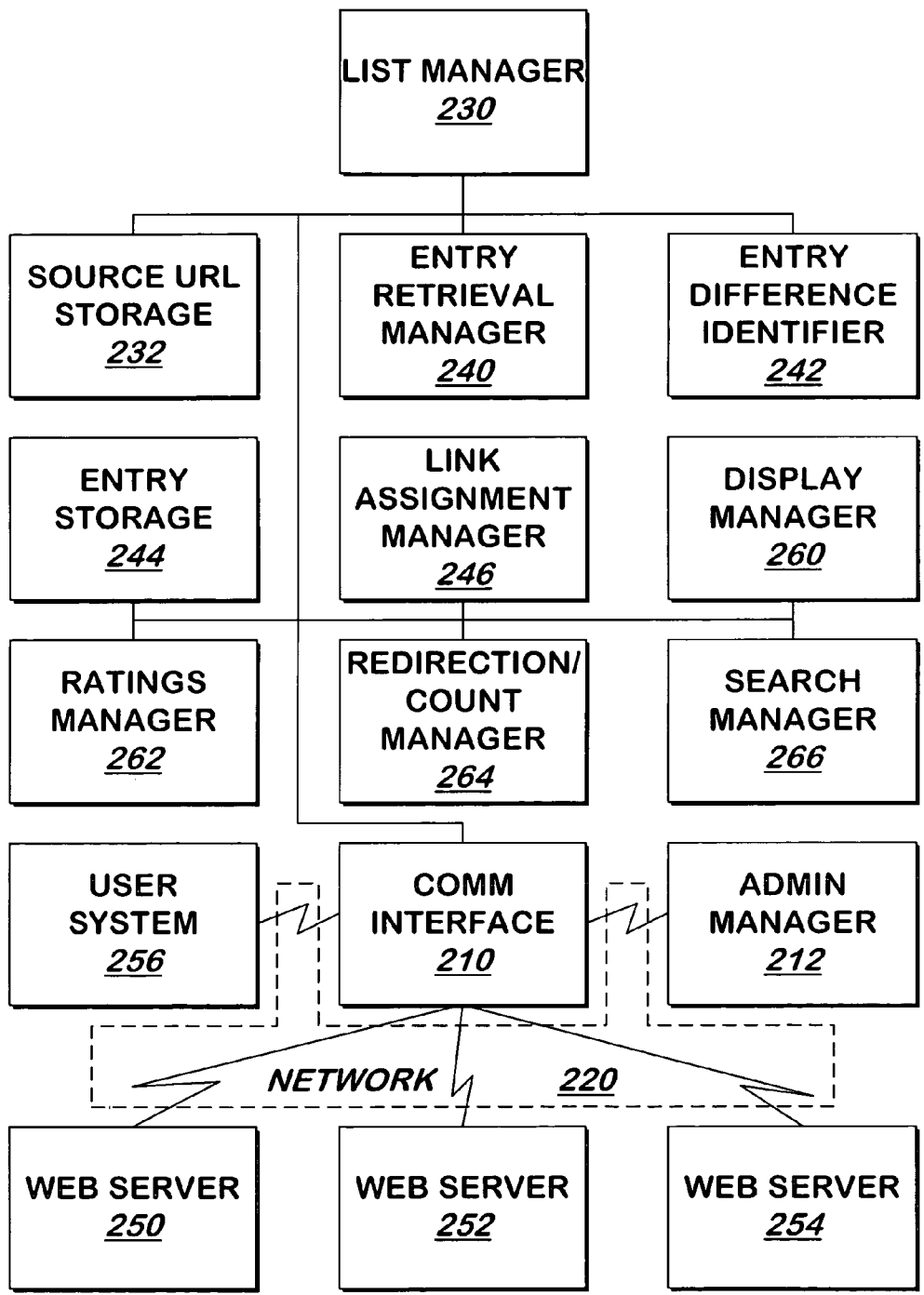
FIG. 2 is a block schematic diagram of a system for consolidating and displaying information from multiple Web sites, and for displaying the popularity of the information relative to other related information according to one embodiment of the present invention.

Referring now to FIG. 2, a system for consolidating and displaying Web information and rating information relative to other similar information is shown according to one embodiment of the present invention. Although the information is described below as Web log entries, the present invention applies to any information, such as syndicated data or other information.

In one embodiment, all communication into or out of the system is made via one or more input/outputs of communication interface 210 which is coupled to a network such as the Internet or a local area network or both. Communication interface 210 is a conventional communication interface that supports TCP/IP or other conventional communication protocols.

Retrieval and Storage of Entries

Entering the List of Source URLs

A system administrator uses administration manager 212, which may be a conventional personal computer system, such as that described above with reference to FIG. 1, to request a user interface that allows the system administrator to designate one or more source URLs from which Web log or other information may be retrieved. As described herein, Web log entries are used, but the system and method may be used for any type of information available on the Internet or other network. When so requested by the system administrator, administration manager 212 signals list manager 230 via communication interface 210 and network 220. The signal may be a request for a Web page provided by list manager 230.

When signaled, list manager 230 provides a user interface that allows the system administrator to enter or edit one or more source URLs into source URL storage 232. A source URL is a URL of a Web page or other source of information containing summary information of Web log entries that will be displayed as described in more detail below. The source URL may not contain the actual Web log entries, which may be located at a location having a different URL, but the source URL contains XML or other code that can be used by a computer system to retrieve summary information for one or more Web log entries or other information.

List manager 230 may provide the user interface to the system administrator via HTML code that administration manager 212 displays via a browser. The system administrator uses administration manager 212 to enter (or edit) the source URL of each Web page containing entries to retrieve as described in more detail below, and to optionally categorize the subject matter of those entries by selecting one of several topics or categories. List manager 230 receives the source URL and category information and stores the source URL in source URL storage 232 associated with the category. In one embodiment, each URL is stored by list manager 230 in a table in a conventional database stored in source URL storage 232 with an identifier of the category selected by the system administrator. In one embodiment, if the URL is newly added to source URL storage 232, list manager 230 marks the source URL as a new source URL.

Marking the URL as new allows the new source URL to be added to the list of source URLs in source URL storage, without next retrieving the entries from that source URL as is described below. As noted below, entries retrieved from a newly added source URL are marked as new so they will not be displayed in certain circumstances described below, and so, as noted below, the mark on the URL allows entry retrieval manager 240 to retrieve the entries and mark them as new. In another embodiment, when a new source URL is added, list manager 230 stores the source URL in source URL storage 232 without marking it as new, but provides the source URL to entry retrieval manager 240. Entry retrieval manager 240 retrieves and processes the entries as described above, marking them as new as a result of receiving the source URL from list manager 230.

The system administrator may then direct list manager 230 to start the operation of entry retrieval manager 240 (or the operation of entry retrieval manager 240 may be automatically started on system startup).

Retrieving the Entries from the Source URL

When signaled by list manager (or when the system starts up), entry retrieval manager 240 selects a source URL from source URL storage 232, and retrieves all of its entries from the Web server 250-254 corresponding to that source URL. Although only three Web servers 250-254 are shown in the Figure, there may be any number of Web servers 250-254 and the source URLs in source URL storage 232 are different URLs corresponding to different Web locations, and each Web location may provided by a different of the Web servers 250-254 from the other pages corresponding to the source URLs stored in source URL storage 232 or the same one of Web servers 250-254 that provide the pages corresponding to other source URLs.

The Web page or other location specified by each source URL may contain header information and one or more Web log entries in an XML, XML-like or other format. Entry retrieval manager 240 parses the header information at the source URL and selects the first entry. In one embodiment, the entries may be in any of several predefined formats, such as RSS, although other formats may be used. RSS is described at the Web site of <<http://xml.com/pub/a/2002/12/18/dive-into-xml.html>>. Entry retrieval manager 240 provides the selected entry and the source URL from which the entry was retrieved to entry difference manager 242.

In one embodiment, each retrieved entry can contain any of several items. It may contain a title of the entry, a description or the first few dozen words of the actual Web log entry to which the entry corresponds (or it may contain the text of the entire actual Web log entry, which entry retrieval manager 240 may truncate), and it may contain a URL to the actual Web log entry to which the entry corresponds. In one embodiment, each actual Web log entry is a Web log journal entry that is intended to be read by a human, whereas the entries retrieved from the source URLs are formatted in a format, such as RSS, for reading by a computer, although the format may be also read by a human. It is possible to have the location specified by the source URL contain the actual Web log entries in another embodiment.

Comparing the Entry to See if it is New or Changed

When it receives an entry, entry difference manager 242 determines if the entry is already stored in entry storage 244. In one embodiment, to determine if the entry is already stored in entry storage 244, entry difference manager 242 removes any excess spaces from the title and compares the title of the entry with the titles of the entries retrieved from that same source URL that are currently stored in entry storage 244 in a case-insensitive manner. If they match or match in a case insensitive manner, entry difference manager 242 indicates to entry retrieval manager 240 that the entry is already stored in entry storage 244 and entry retrieval manager 240 discards the entry and retrieves another one as described in more detail below. If entry difference manager 242 does not find a matching title (or a matching title in a case insensitive manner) from among the entries retrieved from the same source URL, entry difference manager 242 provides the title with the excess spaces removed to entry retrieval manager 240. Entry retrieval manager 240 builds an entry record as described in more detail below, however it substitutes the title with the excess spaces removed received from entry difference manager 242 for the title retrieved. Entry retrieval manager 240 stores the entry record into entry storage 244 and retrieves another entry as described in more detail below. In one embodiment, excess spaces are spaces that do not follow generally accepted rules of grammar, such as more than one space between two words, any space following a word and before a punctuation mark, more than one space following certain punctuation marks such as a comma, more than two spaces following certain other punctuation marks such as a period or a question mark, and any spaces following the last word (if not followed by a'punctuation mark) or punctuation mark (if not followed by a word).

In another embodiment, to determine if the entry is already stored in entry storage 244, entry difference manager 242 hashes the entry it receives from entry retrieval manager 240 and compares the hash result or hash result and title for that entry to other hash results or hash results and titles for entries retrieved from the same source URL and stored in entry storage 244. If no matching hash result from the same source URL is found or no matching hash result and title is found from the same, source URL, entry difference manager 242 provides the hash result to entry retrieval manager 240. If any matching hash result is found, entry difference manager so indicates to entry retrieval manager 240, which discards the entry and selects another entry from that URL as described below.

In one embodiment, the hash function used to produce the hash result is the conventional MD-5 or SHA hash function, although other hash functions may be used.

In one embodiment, when an entry is received by entry difference manager 242, it is also received with an indication as to whether the source URL is new. If the source URL is new, entry difference manager 242 either removes the excess spaces from the title and provides the title to entry retrieval manager 240 or hashes the entry and provides the hash result to entry retrieval manager 240 for storage with the entry as described above, but in either case, does not perform a search for an entry with a matching hash result or has result and title.

Storing the Entry into Entry Storage

If it receives a hash result or title with excess spaces removed from entry difference manager 242, entry retrieval manager 240 stores the entry, the source URL from which the entry was retrieved, the date and time retrieved from the operating system, a unique identifier, and the hash result or title with spaces removed as an entry record into entry storage 244. Entry storage 244 may include conventional memory or disk storage and may contain a database, and each entry record may be stored as a row in a database table. The entry record may be stored in a category table that corresponds to the category associated with the URL in source URL storage 232 or, if all entries are stored in a single table, the category associated with the source URL in source URL storage 232 may be stored as part of the entry record. The entry may contain the URL of the actual Web log entry and entry retrieval manager 240 stores the URL of the actual Web log entry into the entry record in entry storage 244 when it stores the entry as described above.

The date and time stored with the entry record may be the local time or may be converted into the current time of another time zone, such as GMT or UTC by entry retrieval manager 240. Any other time conversion may be used, because, as described below, the time may be converted to the user's local time when the information from the entry record is displayed to the user. Such conversion will occur on the user system 256 in one embodiment of the present invention.

Marking the Entry As New

If the source URL was marked as a new URL or received from list manager 230 as described above, entry retrieval manager 240 marks the entry record as a "new" entry record, which, as described below, will cause it not to be initially displayed, as described in more detail below, although in one embodiment, when the system is initially started, no such entries are marked as new: entries are marked as new only when the system updates the entries after entries from all of the source URLs are loaded into entry storage 244. The suppression of the display of such entries helps prevent old entries from being treated as new entries. Although each entry may have a date and time that it was initially provided on the Web site, as noted above, the system and method uses the date and time of retrieval as the date and time of the entry. Because this date and time may be well after the date and time the entry was provided, suppression of the display of such entries can help prevent entries from being displayed with a date and time that may be well after the actual date and time the entry was provided on the Web site of the source URL.

In the embodiment in which a hash result is used, if entry difference manager 242 locates an entry with a matching title and source URL but a different hash result, the entry may have been changed. In this case, in one embodiment, entry difference manager 242 provides the hash result and the identifier of the entry having the matching title and source URL to entry retrieval manager 240. Entry retrieval manager 240 builds the entry record as described above, but uses the identifier received from entry difference manager 242 as the identifier of the entry and substitutes the entry record for the entry record stored in entry storage 244 having that identifier.

When entry retrieval manager 240 has completed storing or discarding the entry, entry retrieval manager 240 retrieves another entry from the URL and repeats the process described above. If there are no additional entries at the selected source URL, if the source URL was marked as new, entry retrieval manager 240 unmarks the source URL as new in source URL storage 232. Entry retrieval manager 240 selects another URL from source URL storage 232 and repeats the process of retrieving and optionally storing entries. When there are no additional source URLs to select, entry retrieval manager 240 signals operating system (not shown) to signal it at the end if a period, such as thirty minutes. When signaled by the operating system, entry retrieval manager 240 repeats the process of retrieval and optional storage of entries as described above.

At any time, the system administrator can add new source URLs (and categorize them) to source URL storage 232 as described above. When entry retrieval manager 240 repeats the process, it will process the new source URLs as described above. In another embodiment, when a new source URL is received as described above, list manager 230 signals entry retrieval manager 240 via the operating system and provides it the new source URL without waiting for the operating system timer. Entry retrieval manager 240 processes the entries from that source URL. Entries from all source URLs are processed when entry retrieval manager 240 receives the signal from the operating system as described above.

Operator of Web Site can Initiate Entry Retrieval Process

In one embodiment, an operator of any Web site or the Web server 250-254 listed in source URL storage 232 may indicate that the Web site has a new or updated entry by sending a message containing the source URL of the Web page containing the entries and a 35 character password to entry retrieval manager 240 via communication interface 210 and network 220. Entry retrieval manager 240 compares the URL received with the source URLs listed in source URL storage 232 and if it locates a match, entry retrieval manager 240 looks up the 35 digit password associated with that source URL in source URL storage 232. If the password matches, entry retrieval manager 240 processes the entries as described above for that source URL.

In one embodiment, the system administrator supplies an e-mail address of the operator of the Web site containing the entries and provides the 35 character password to list manager 230 when the system administrator supplies the corresponding source URL to list manager, although in another embodiment, the system administrator only supplies the e-mail address and list manager 230 randomly generates the 35 character password. List manager 230 stores in source URL storage 232 the 35 digit password, and optionally, the e-mail address, in a manner associated with the corresponding source URL. List manager 230 e-mails the password to that e-mail address with a message indicating that entries from the operator's Web site are being consolidated, and instructing the operator to send the request with the 35 digit password. In one embodiment, the e-mail contains a link that the operator can use to make the request as described above. The link includes a domain that resolves to entry retrieval manager 240, as well as the source URL and password, and when the operator clicks the link, entry retrieval manager 240 receives a request, parses the source URL and password, and initiates the procedure described above. In addition, entry retrieval manager 240 may provide in response to the request a Web page indicating that the request has been received.

In another embodiment, the system administrator can call the operator of the Web site with the password, which can be entered with the source URL into a Web page supplied by entry retrieval manager 240.

Display of Entries for Users

When a user wishes to see a consolidated list of Web log entries for a given category or topic, the user uses user system 256, which may be a conventional computer system with a conventional browser as described above with reference to FIG. 1. User system 256 connects to a Web site that is provided by display manager 260, which may include a conventional Web server that operates as described herein.

When the user so connects, display manager 260 displays a user interface that allows the user to select a category from among several categories. In one embodiment, one such category is a default category and this category is considered by display manager 260 to be selected by the user until the user makes a different selection. The user may select a category by clicking a link from among several links that each correspond to different category, and that are displayed on some or all pages described herein.

Display manager 260 provides for display (e.g. by providing HTML Web pages for display by a browser) information from each entry record in entry storage 244 corresponding to the selected category (referred to as a displyed entry, whether or not the entry is in fact already displayed at the time it is referenced as a displayed entry), as well as other information, all formatted as described below. In one embodiment, the information from each entry record and the other information are displayed in reverse chronological order (e.g. most recent first) based on the date and time in the entry, and only a limited number (e.g. 60) of entries in entry storage 244 are provided for display. The information from the entry records and other information may be provided for display using multiple pages, for example, four pages of fifteen entry records and their associated other information. Display manager 260 also includes on each of the Web pages it provides, links to allow the user to view the other pages of entry record information on each such page.

In one embodiment, display manager 260 does not provide for display information from entry records marked as new. As noted above, this prevents a new Web site from dominating a contiguous block of the displayed entries.

Assigning the Link to the Entry

Before displaying each of the displayed entries as described herein, display manager 260 provides the identifier of the entry record to link assignment manager 246. When link assignment manager 246 receives the identifier of the entry record, link assignment manager 246 builds and provides to display manager 260 a link to be used to identify the entry and supply the URL of the actual Web log entry corresponding to the entry record, the URL being part of each entry it retrieves. To build the link to be used to identify the entry and supply the URL of the actual Web log entry corresponding to the entry record, link assignment manager 246 retrieves from the entry record in entry storage corresponding to the identifier it received the URL of the actual Web log entry. Link assignment manager 246 builds a text string in the form of the following appended fields: "protocol" "domain" "optional redirection signal" "identifier" "actual URL", where protocol may be the protocol used by communication interface 210, such as "http://", domain is the domain that resolves to communication interface 210, e.g. "ww.markme.com" (where the ww is actually replaced by www), optional redirection signal is an optional signal to communication interface 210 that the URL is a URL that should cause a redirection as noted below, identifier is the identifier of the entry record received from entry retrieval manager 240 and actual URL is the actual URL stored in the entry record as described above. Identifier and actual URL may be built into the link as conventional parameters, with parameter names and other characters, such as "id=" and "url=" in addition to the identifier and actual URL, as is described in more detail below. As example of a link built by link assignment manager 246, a link field of http://ww.markme.com/mxna/click.cfm?id=9F90A495-EFC0-3447-D748F53215E76DC5&url=http://markme.com/archives/005124.cfm may be stored, with "ww." replaced with "www." The protocol is "http://", the domain is "ww.markme.com/" (again, the "ww." is replaced with "www."), the redirection signal is "mxna/click.cfm?" the identifier is "id=9F90A495-EFC0-3447-D748F53215E76DC5" and the URL of the actual Web log entry is "&url=http://markme.com/archives/005124.cfm". When link assignment manager 246 has built the link as described above, link assignment manager 246 provides the link to display manager 260 as a text string.

Although as described herein, link assignment manager 246 builds the link at the time an entry is displayed, in another embodiment, link assignment manager 246 receives the identifier of the entry record from entry retrieval manager 240 after the entry record is stored. In such embodiment, link assignment manager 246 builds the link as described above, and stores it into the entry record. In such embodiment, display manager 260 uses the link stored into the entry record.

In one embodiment, display manager 260 provides for display the information from each entry record it selects, as well as the other information associated with each such entry record, including a title, the date and time recorded in the entry, the description (or first few dozen words), and other information stored by a system administrator in source URL storage 232 and that may be associated with the source URL stored in the entry record. For example, the name of the author and a URL to the Web log of that author may be stored by the system administrator into source URL storage 232 in a manner associated with the URL, and that name may be displayed as a link to the Web log using a URL to the Web log also stored in source URL storage 232 by the system administrator or such information may be part of the header information retrieved at the source URL and such information may be stored by entry retrieval manager 240 with each entry retrieved from that source URL as part of the entry records it builds. For each such displayed entry, display manager 260 provides the title as the label text of a link, using the link field that was either received from link assignment manager 246 or retrieved from the entry record, as the target URL for the link.

As noted in more detail below, each displayed entry that has a date and time of receipt in its entry record within a time window, such as the last twenty four hours, is provided for display by display manager 260 with a rating that indicates the number of clickthroughs to the actual entry corresponding to the displayed entry relative to other entries in that same category received that are received within that time window (or a different time window).

The User Clicks the Link

If the user clicks the link for which the title is the link label text, user system 256 will generate a request corresponding to the link to communication interface 210. Although only one user system 256 is shown in the Figure, there may be any number of user systems, each of which are similar or identical to user system 256. As noted above, the link contains a redirection signal, which causes communication interface 210 to provide the link and the source IP address from the packet or packets that make up the link to redirection/count manager 264. When redirection/count manager 264 receives the link, it parses the identifier and URL at the end of the link. Redirection/count manager 264 then increments a clickthrough counter associated with the entry record corresponding to the identifier (and may be stored in the database) in entry storage 244. Redirection/count manager 264 then uses the source IP address and builds a redirect command that, when sent to the user's browser using the source IP address received with the user's request, will cause the browser in user system 256 to request the actual Web log entry using the URL contained in the link. Redirection/count manager 264 provides the redirection command to the user's browser and the user's browser will redirect to the URL of the actual Web log entry.

Each Page of Entries May be Displayed with Ratings

Before display manager 260 displays each page of displayed entries using the entry records and other information as described above, display manager 260 signals ratings manager 262 with an identifier of the selected category and optionally, with an indication of the entry records that will be displayed as displayed entries on the page (e.g. using the first and last identifiers of those entry records).

When so signaled, ratings manager 262 uses a calculation technique to segregate into one of several groups each of the entry records corresponding to the displayed entries that display manager 260 is about to display on the page that have been received in a time window, such as the last twenty four hours from the current date and time (the entries meeting this criteria are referred to as the "set" of entries). The segregation is based, at least in part, on number of clickthroughs in the clickthrough counter for each entry record in the set relative to the other entry records in the set, so that each group corresponds to differing levels of popularity.

In one embodiment, ratings manager 262 first identifies a relative clickthrough score for a set of some or all of the entry records in the category. The set may include only the entry records having information about to be displayed, entry records having a date and time of receipt within a certain window such as twenty four hours from the current time, entry records meeting both of the above criteria or a larger or smaller number or different set of entry records. In one embodiment, to calculate the relative clickthrough score, ratings manager 262 retrieves the current date and time from the operating system (not shown) and sums the clickthrough counters for the set of each of the entry records corresponding to the topic it receives that have a received date and time greater than twenty four hours before the current date and time in order to obtain a total number of clickthroughs, and then divides the clickthrough counter for each of the entry records in the set by the total number of clickthroughs to produce a relative clickthrough score for each entry record in the set.

In one embodiment, the relative clickthough score for an entry record is calculated as a function of clickthrough counters and also of the difference between the time in which the entry was stored and the current time, which ratings manager 262 retrieves from the operating system (not shown). This can allow for entries that were received recently to be on more of an equal footing with entries that may have been received a fair amount of time ago and that may have received more clickthroughs, not because they were more interesting, but because they have been in entry storage 244 longer. Ratings manager 262 may initially calculate the relative clickthough score for an entry record as described above, but may then adjust the relative clickthrough score in a manner based on the difference in time from when the entry was received (such time being stored in the entry record) to the present time. For example, after it calculates the relative clickthrough score as described above, ratings manager 262 may increase the relative clickthrough score by ten percent if the entry has been received in the last five minutes, and may decrease the relative clickthrough score by twenty percent for any entry received more than 30 minutes ago.

Ratings manager 262 then assigns each of the entry records in the set of entry records to a group based on its relative clickthrough score. In one embodiment, ratings manager 262 first identifies the relative clickthough scores that will correspond to each group by identifying the highest relative clickthrough score and assigning that score as the upper bound for the first group, and dividing that score by the number of groups to produce a division result. The division result is subtracted from the highest relative clickthrough score to produce a lower bound of the first group, and ratings manager 262 assigns to the first group all entry records (or all entry records that are about to be displayed by display manager 260) with relative clickthrough scores lower than or equal to the upper bound for the group, and above the lower bound. The assignment may be made by setting a group identifier equal to the number of groups and storing the group identifier into the entry records assigned to the first group.

Ratings manager 262 then assigns the lower bound as the new upper bound for the next group, and subtracts the division result from the old lower bound to produce a new lower bound for the next group. Ratings manager 262 then subtracts one from the group identifier, and repeats the process described above, assigning to the group corresponding to the group identifier, those entries in the set, that have a relative clickthrough score equal to or lower than the upper bound and higher than the lower bound, and continues repeating this process until it has completed assigning to a group all of the entries in the set.

Entries having a relative clickthrough score of zero may be assigned to the lowest numbered group, group 1.

In another embodiment, instead of using the process described above to assign entry records to groups, ratings manager 262 sorts the entry records by relative clickthrough scores and assigns an approximately equal number of entry records to each group based on the relative clickthrough score (although it may only store such assignment for those entry records about to be displayed). As noted above, ratings manager 262 may store an identifier of the group to which an entry record has been assigned into the entry record, for all entry records in the set or just the records about to be displayed that are also in the set. When ratings manager 262 has completed assigning to a group each of the entry records in the set or each of the entry records in the set that are about to be displayed by display manager 260, it signals display manager 260.

Display manager 260 provides for display the information from the entry records as described above, however it also provides for display an indication of the group to which the entry record corresponding to the displayed entry has been assigned near the information displayed. In one embodiment, the indication of the group is displayed by representing the number of the group as a number of half "stars" with which the information from each entry record assigned to the group will be displayed, with five stars indicating that the entry record is in the group of most popular entries and zero stars indicating that the entry record is in the least popular group, a total of 11 groups in all. Display manager 260 provides with the information from the entry records, icons that illustrate a number of colored half stars corresponding to the group identifier of the entry record, with icons for the remainder of the maximum possible stars being displayed in gray. Thus, an entry record assigned to group six would have its information displayed to the user as a displayed entry with the two rightmost stars displayed in full color, the two leftmost stars displayed in gray, and the middle star displayed with the left half in gray and the right half colored, indicating to the user that the number of clickthroughs (and optionally, time) for that displayed entry warrants two and'one half stars. Display manager 260 provides for display the information corresponding to each of the entry records containing the information it provides as described above, but does so with an indication (such as stars, though other indications may be used) of the group to which the entry record from which the information was retrieved has been assigned. Display manager 260 provides such indications with the information from the entry records it provides on the page, with the indications provided in a manner that will cause their display along one side, such as the right side, of the window in which the information is displayed, so that a user can scan down that side of the page to see the indications and make a decision as to which titles to click to see the actual Web log entry based on what other users have determined.

Adjustment for Time Zone Differences

In one embodiment, to provide the entries for display, display manager 260 provides JavaScript code (in the same page that contains or refers to the entries for display or in a different file) that contains a function or procedure that receives a date and time and optionally, an indication of the time zone to which that date and time corresponds, and converts and writes to the user's browser for display the date and time adjusted into the user's time zone. To perform this function, the JavaScript or other function or procedure requests from the operating system the time zone stored in the registry of user system 256. The JavaScript or other function or procedure then uses the indication of the time zone corresponding to the date and time it receives (or such time zone may be fixed as part of the JavaScript or other function or procedure) and the time zone of the user's system to provide the date and time, adjusted to the time zone specified by the user's computer system as described in more detail below. Although JavaScript is described herein, other languages may be used and other entities, other than functions or procedures, may also be used.

When display manager 260 provides the page containing the displayed entries, it provides the date and time (and optionally the time zone to which the date and time corresponds) for each entry as a function or procedure call of the JavaScript or other function or procedure. The user's browser will provide the date and time to the JavaScript or other function or procedure. The JavaScript or other function or procedure then writes to the browser the adjusted date and time for display to the user.

Retraction of Click Through Count

A user who clicks through to an actual Web log entry using the link assigned to the entry record by link assignment manager 246 as described above may determine that the actual entry wasn't nearly as interesting as described, and yet the user's click through to it would have caused it to increase its "standing" in the rating process described above. In one embodiment, display manager 260 displays a link that allows a user to retract his or her click through count that was incremented by ratings manager 262 when the user clicked through to it as described above.

To perform this display manager 260 assigns a second link to each entry record at the time it displays them, the second link having the identifier of the entry record, and containing an indication of the identifiers of the first and last entry records having information displayed on the page and other information that can allow display manager 260 to display a similar or identical page. Display manager 260 displays this second link with label text such as "I Wish I Hadn't Clicked on This Entry" or an icon that allows a user to retract his or her count for that entry. When the user clicks the link, redirection/count manager 264 decrements the counter corresponding to the identifier in the link, and either redirects the user to the same or a similar page that display manager 260 displayed when the user clicked the link, except that it displays an indication that the click was received, or redirects the user to a page that indicates the click was received and then redirects the user to a page that has the same or similar appearance as the one the user was viewing when the user clicked the link.

In one embodiment, when redirection/count manager 264 receives the click through from the link that caused the counter to be incremented, it places a cookie on the user's system that indicates the identifier corresponding to the entry retrieved. When the user attempts to click the second link to cause the counter to be decremented, redirection/count manager 264 retrieves the cookie and ensures that the identifier contained therein matches the identifier of the entry record before it decrements its counter, and then replaces the cookie with one containing a different identifier. If the identifiers don't match, redirection/count manager 264 does not decrement the counter of the entry having the identifier in the second link. In one embodiment, if the identifiers do match, redirection/count manager 264 decrements the counter, and also stores the user's source IP address and the identifier in a circular buffer. Redirection/count manager 264 checks the buffer before decrementing the counter as described above for a stored source IP address and the identifier to ensure that a user does not manipulate the cookies to cause the counter for a particular entry to be decremented more than once in any given period.

Search

In one embodiment, some or all of the pages displayed by display manager 260 contain a link that can allow the user to search for an entry having certain one or more characteristics that match a user-supplied search criteria, such as entries that contain text that matches a set of characters supplied by the user. The link designates a search entry page that is also provided by display manager 260 to the user's browser on user system 256 for display to the user. The search entry page contains user interface elements such as text boxes and the like that allows the user to designate the search criteria, and a button indicating that the search should be performed. When the user enters the criteria and clicks the button, user system 256 supplies the search criteria to display manager 260, which provides them and an identifier of the currently selected topic, to search manager 266. Search manager 266 scans the entries in entry storage 244 for entry records having one or more characteristics that correspond to the one or more characteristics supplied by the user and supplies a list of the identifiers of any such entries to display manager 260. The entries marked as new are included in the scan and their identifier may be supplied in the list of identifiers, allowing such entries to be searched even if they are not displayed as described above. Display manager 260 displays the information corresponding to the zero or more entries on the list it receives from search manager 266 as described above, including breaking the list into multiple pages and displaying the list on a page with links to the various topics and to the search capability.

Methods

Figure 3:
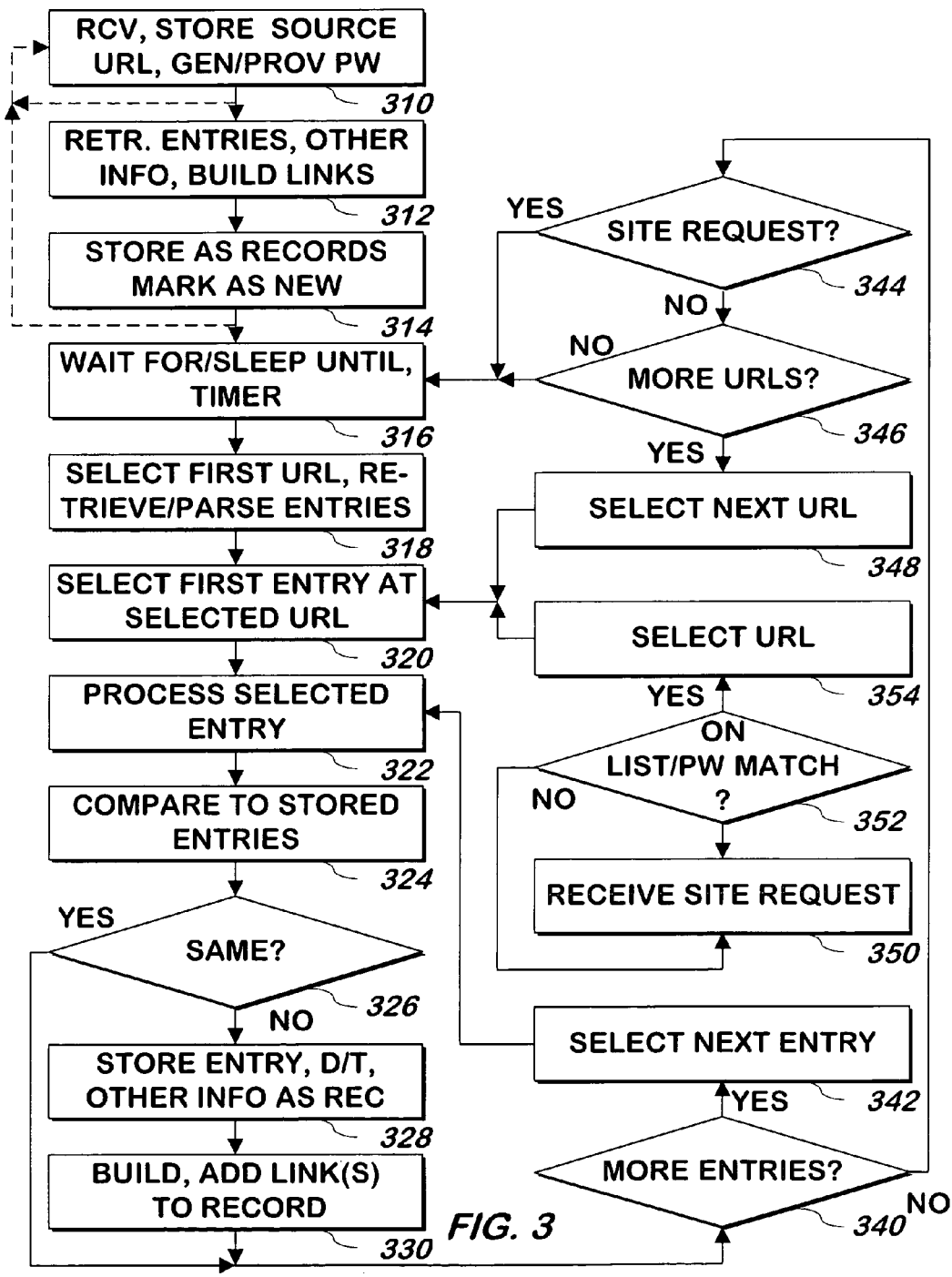
FIG. 3 is a flowchart illustrating a method of receiving and storing Web information according to one embodiment of the present invention.

Referring now to FIG. 3, a method of receiving and storing Web information is shown according to one embodiment of the present invention. A source URL of a Web page that contains Web log entry information, for example in an XML format such as RSS, and other information such as described above is received and stored 310 and the method may continue at step 310 as part of an independently running process to receive and store additional source URLs and also continues at step 312. Step 310 may include generating and storing a password for the source URL for use as described herein, receiving an e-mail address and e-mailing the password or a link containing the password and source URL to the operator of the Web site corresponding to that source URL. The header and Web log entry information is retrieved from the URL received in step 310 and other information, such as the date and time of retrieval of the Web log entry information, is received or retrieved as described above, one or more links are built for each entry as described above 312. The one or more links, the Web log entry information, and other information retrieved, received, or identified, such as the date and time of receipt and a hash result of the entry, are stored 314 as described above and marked as new records. The method may continue at step 310 as shown by the dashed line in the figure, and also at step 316.

At step 316, the method may wait for a timer or may sleep until a timer is received. One of the one or more source URLs stored as described above with respect to step 310 is selected 318 and a group of the entries (and optionally the header information) at that source URL are retrieved and parsed into entries. A first of those entries in the group corresponding to the selected source URL is selected 320. The selected entry is processed for subsequent comparison, for example, by hashing it to produce a hash result. The selected entry is compared to other stored entries retrieved from that source URL 324 and if the selected entry is the same (e.g. same hash result or same hash result and title or same title with excess spaces removed, compared in a case-insensitive manner) as another such stored entry from that source URL 326, the method continues at step 340 and otherwise 326, the entry, date and time, and other information such as a unique identifier, the hash result, source URL, category associated with that source URL and other information associated with the source URL is stored as described above 338, and one or more links are optionally built and added to the record either before or after it is stored, as described above 330 and the method continues at step 340.

Step 338 may include replacing an entry with the same title and source URL but a different hash result as described above.

At step 340, if there are more entries from the selected source URL 340, another such entry is selected 342 and the method continues at step 322 and otherwise 340, if the source URL was processed as a result of a request from the operator of the Web site (as is described above and also below with respect to step 350), the method continues at step 316 and otherwise 344, the method continues at step 346.

At step 346, if there are more source URLs on the list of source URLs, another source URL on the list is selected 348 and the method continues at step 320 and otherwise 346, the method continues at step 316.

As noted above, the operator of a Web site or the Web site itself may send a request to retrieve and check for new entries. If such a request is received 350, and the URL specified is on a list of source URLs and the password matches the password stored for that source URL 352, the URL specified in the request is selected as the current source URL 354 and the method continues at step 320, and if not 352, the method continues at step 350, with another site request, the current one being discarded.

Figure 4:
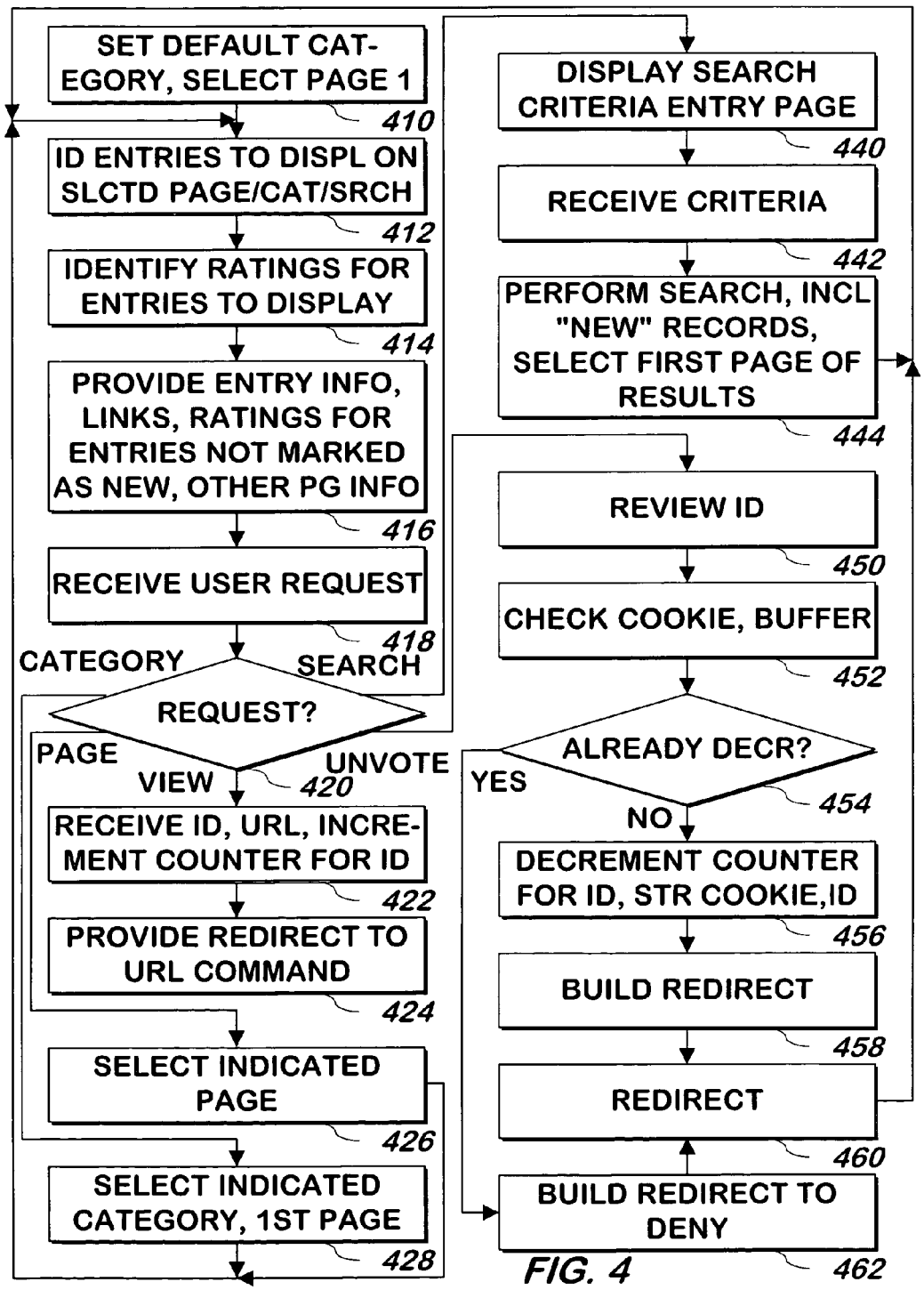
FIG. 4 is a flowchart illustrating a method of displaying Web information according to one embodiment of the present invention.

Referring now to FIG. 4, a method of displaying information retrieved from multiple different locations on the Internet is shown according to one embodiment of the present invention. A default category is selected as the current category and the current page is designated as page 1 410. The entry records to display as displayed entries on the current page of the current category (or of the search) are identified 412 as described above. For at least those entry records identified in step 412 that are in a set of entries as described above, ratings are assigned 414 relative to other entries in the current category as described above. For such entries in the set of entries and identified in step 412 and not identified as new, the entry information and other information (including other information) as well as the links (which may be built as described above) and an indication of the ratings is provided for display, and page information, such as links to other pages, other topics and a search is provided for display 416. Step 416 may include displaying titles of entries as the label text to the link that causes a counter for the entry to be incremented and causes the user's browser to redirect the user to the actual entry as described above. Step 416 may also include providing for display the date and time of each of the entries using the JavaScript or other function or procedure technique described above, and with reference to FIGS. 5 and 6.

A user request is received 418 using one of the links on the page. If the request received in step 418 is a request generated by clicking on the title or other user action indicating the user wishes to view the actual entry 420, the identifier of the entry and optionally, the URL of the actual Web log entry is received and a counter corresponding to the identifier received is incremented, and a command to redirect the user to the URL corresponding to the actual Web log entry corresponding to the identifier or the URL that is received as part of the command is provided 424.

If the request received in step 418 is a request to display another page of the entries 420, the indicated page is selected as the current page 426 and the method continues at step 412.

If the request received in step 418 is a request to change the category 420, the indicated category is selected as the current category and the first page of entries of that category is selected as the current page 428 and the method continues at step 412.

If the request received in step 418 is a request to search the entries 420, a page allowing the user to enter search criteria is provided 440 and the search criteria is received 442 and entries such as all entries stored, including those stored and marked as new, are searched to produce the search results and the first page of such results is selected 444 and the method continues at step 412.

If the request received in step 418 is a request to remove the user's popularity vote 420, the identifier of the displayed entry can be received with the request in step 418 and so the identifier will be reviewed 450 to locate the counter for the entry. A cookie or identifier of the user (such as an IP address) and the identifier of the entry may be reviewed 450 to determine 452 whether the counter corresponding to the identifier of the entry has not been decremented on behalf of that user as described above. If not 454, the counter corresponding to the identifier of the displayed entry is decremented and a cookie stored in step 422 containing the identifier of the displayed entry may deleted or altered as described above and/or the user's identifier and the identifier of the displayed entry may be stored in a buffer as described above 456. A command is built 458 that redirects the user to the same page the user was viewing, but that indicates that the user's vote has been removed from that displayed entry or redirected to a page confirming the removal of the vote or to a page that so instructs the user and then redirects the user to the page the user was viewing. The redirect command is provided 460 thereby causing the user's browser to redirect the user and the method continues at step 412. If the user has already decremented the counter for the entry corresponding to the identifier 454 the a redirect command is built 462 that redirects the user to the same page the user was viewing, but with an indication that the user's vote has not been removed, or to a page that so informs the user and then redirects the user to the page the user was viewing and the method continues at step 460 using that command.

Figures 5, 6:
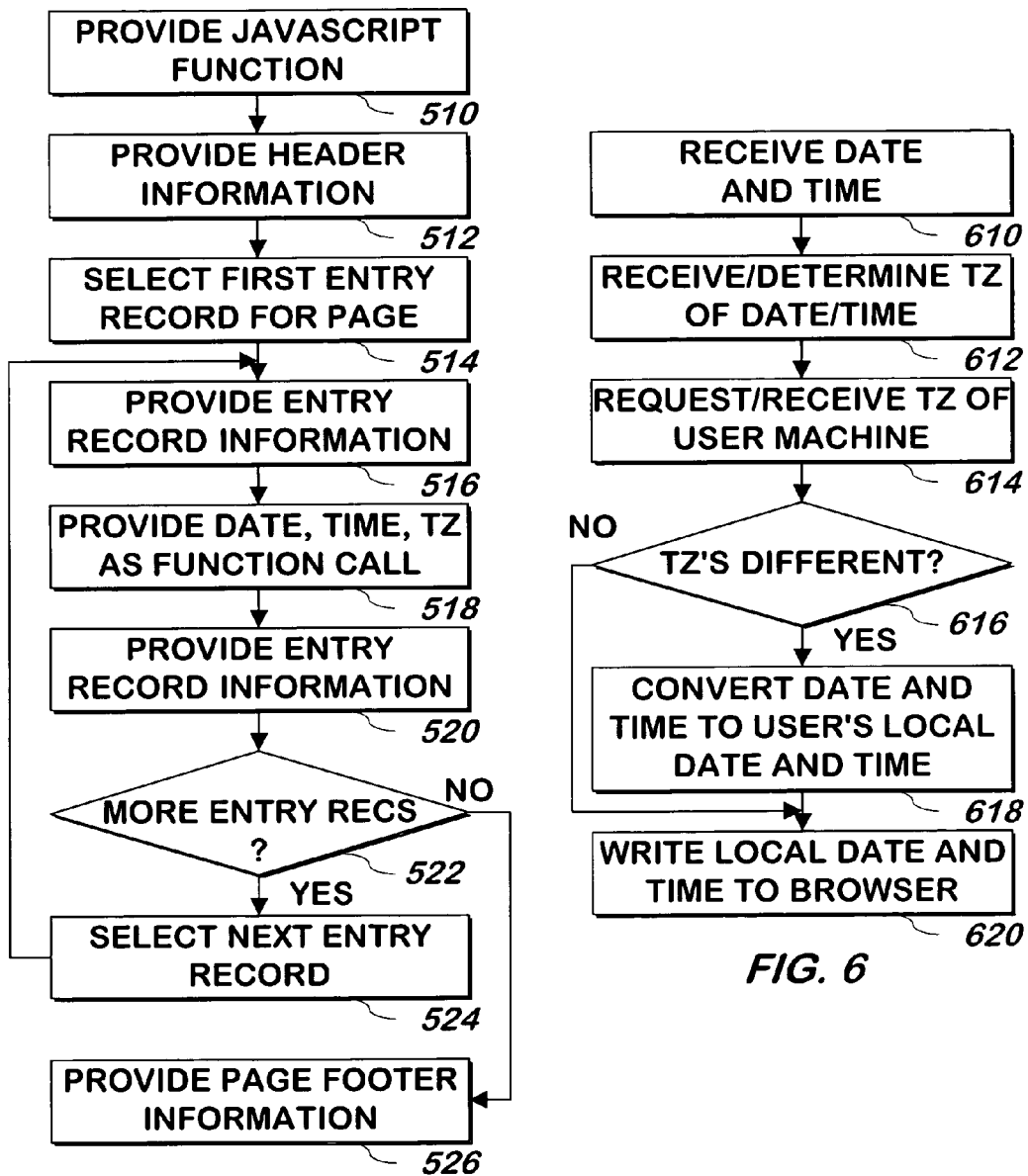
FIG. 5 is a flowchart illustrating a method of providing entries for display according to one embodiment of the present invention.
FIG. 6 is a flowchart illustrating a method of adjusting a date and time for a user's local time zone according to one embodiment of the present invention.

Referring now to FIG. 5, a method of providing entries for display is shown according to one embodiment of the present invention. A JavaScript or other function or procedure that performs the steps of FIG. 6 is provided 510, for example, in a separate file, or the same web page as is sent to the user that contains or refers to the displayed entries. Header information, information that will be displayed before the first displayed entry on the page, may be provided 512. The first entry record is selected for the page 514. Some or all of the information for the selected entry record is optionally provided 516, for example to a browser for display to a user. A date and time corresponding to the selected entry record and optionally the time zone to which the date and time corresponds, is provided as a function or procedure call 518.

Any remaining information for the selected entry record is provided 520. If there are any additional entry records for which information from such entry records is to be displayed as displayed entries on the page 522, another entry record is selected 524 and the method continues at step 516, and otherwise 522, footer information, information to be displayed after the last of the displayed entries on the page, is provided 526.

Referring now to FIG. 6, a method of adjusting a date and time for a user's local time zone is shown according to one embodiment of the present invention. A date and time is received 610, for example as part of a function or procedure call. The time zone of the received date and time is either received or determined 612, for example by determining the date and time is provided in a predetermined time zone, such as GMT or UTC. The user's local time zone is requested and received 614.

If the two time zones are different 616, the received date and time is converted 618 into the user's local date and time, and the method continues at step 620, and otherwise 616, the method continues at step 620.

At step 620, the date and time received, converted into the user's local date and time if necessary as described above, is written to a browser for display to a user.

What is claimed is:

1. A method of displaying information, comprising:
   retrieving over a network from a plurality of sources, a plurality of summaries of sets of information, the sets of information being stored on a plurality of servers over the network;
   for each of the summaries in the plurality:
      identifying a timestamp of when each said summary was retrieved; and
      storing, associated with said summary, the timestamp;
   detecting a number of times the sets of information have been viewed; and
   providing, to a browser for display of a web page, at least a portion of each of at least some of the summaries with a standalone indication responsive to the number of times the sets of information corresponding to each said summary have been viewed relative to the number of times other sets of information, for which the timestamp corresponds to a criteria, have been viewed, wherein the providing comprises providing, for each of the provided summaries, a first link including an identifier of a provided summary and an address of a computer system on the network, wherein the criteria comprises a time period ending with a current time, and
   wherein the detecting comprises:
      receiving, at the computer system, the identifier in response to a selection of the first link on the web page;
      incrementing, in response to the selection of the first link on the web page, a counter corresponding to the identifier, the indication being responsive to the counter and a difference between the timestamp and the current time; and
      sending, to the browser, a redirect command in response to the selection of the first link, the redirect command comprising an address of a server source of the set of information corresponding to the identifier,
   wherein the method further comprises selectively providing, to the browser, a second link for retracting a click through of the first link such that a click through of the second link causes the counter to be decremented, detecting the click through of the second link, and decrementing the counter based on the click through of the second link.

2. The method of claim 1, wherein the at least a portion of a plurality of the plurality of summaries are retrieved in an XML format.

3. The method of claim 2, wherein the XML format comprises RSS.

4. The method of claim 1, wherein the time period is twenty four hours.

5. The method of claim 1, wherein the redirect command comprises a URL from which the set of information corresponding to the identifier can be retrieved.

6. The method of claim 1, additionally comprising:
   detecting a time zone of a computer system to which the at least the portion of the at least some of the plurality of summaries are provided; and
   responsive to the time zone detected:
      adjusting the timestamp for each of the summaries provided to produce an adjusted timestamp; and
      providing for display with each of said portion of the at least some of the plurality of summaries, one selected from the timestamp and the adjusted timestamp corresponding to said summary.

7. A computer program product comprising a non-transitory computer useable medium having computer readable program code embodied therein for displaying information, the computer program product comprising computer readable program code devices configured to cause a computer system to:
   retrieve over a network from a plurality of sources, a plurality of summaries of sets of information, the sets of information being stored on a plurality of servers over the network;
   for each of the summaries in the plurality:
      identify a timestamp of when each said summary was retrieved; and
      store, associated with said summary, the timestamp;
   detect a number of times the sets of information have been viewed;
   provide, to a browser for display of a web page, at least a portion of each of at least some of the summaries with a standalone indication responsive to the number of times the sets of information corresponding to each said summary have been viewed relative the number of times other sets of information, for which the timestamp corresponds to a criteria, have been viewed, wherein the criteria comprises a time period ending with a current time;
   provide, for each of the provided summaries on the web page, a first link including an identifier of a provided summary and a network address of the computer system;
   receive, at the computer system, the identifier in response to a selection of the first link on the web page;
   increment, in response to the selection of the first link on the web page, a counter corresponding to the identifier, the indication being responsive to the counter and a difference between the timestamp and the current time;
   send, to the browser, a redirect command in response to the selection of the first link, the redirect command comprising an address of a server source of the set of information corresponding to the identifier;
   selectively provide, to the browser, a second link for retracting a click through of the first link such that a click through of the second link causes the counter to be decremented;
   detect the click through of the second link; and
   decrement the counter based on the click through of the second link.

8. The computer program product of claim 7, wherein the at least a portion of a plurality of the plurality of summaries are retrieved in an XML format.

9. The computer program product of claim 8, wherein the XML format comprises RSS.

10. The computer program product of claim 7, wherein the time period is twenty four hours.

11. The computer program product of claim 7, wherein the redirect command comprises a URL from which the set of information corresponding to the identifier can be retrieved.

12. The computer program product of claim 7, additionally comprising computer readable program code devices configured to cause the computer system to:

detect a time zone of a computer system to which the at least the portion of the at least some of the plurality of summaries are provided; and responsive to the time zone detected:

adjust the timestamp for each of the summaries provided to produce an adjusted timestamp; and provide for display with each of said portion of the at least some of the plurality of summaries, one selected from the timestamp and the adjusted timestamp corresponding to said summary.

13. A system comprising:

a storage device configured to store information comprising a plurality of summaries corresponding to different web pages, counter values corresponding to the web pages, and retrieval times associated with the summaries, the retrieval times respectively comprising timestamps of when each summary was retrieved, wherein the web pages are hosted on a plurality of servers; and one or more computer systems that are communicatively coupled with the storage device and configured to perform operations comprising:

providing, to a browser for display, at least a portion of the summaries with respective standalone indications and respective first links for accessing the corresponding web pages, the standalone indications being responsive to the counter values, the retrieval times, and a criteria, each of the standalone indications being responsive to a number of times a web page corresponding one of the summaries has been viewed relative to a number of times other web pages have been viewed, each of the standalone indications being responsive to a difference between a corresponding timestamp of the timestamps and a current time;

receiving a notice that a selected first link of the first links is selected via the browser, the selected first link being indicative of a selected web page of the web pages;

incrementing, in response to the selected first link, a counter value of the counter values that corresponds to the selected web page;

sending, in response to the selected first link, a redirect command to the browser, the redirect command comprising an address of a server hosting the selected web page; and selectively providing, to the browser, a second link for retracting a click through of the selected first link such that a click through of the second link causes the counter value to be decremented;

detecting the click through of the second link; and decrementing the counter based on the click through of the second link.

14. The system of claim 13, wherein the criteria comprises a time period ending with the current time.

15. The system of claim 14, wherein the time period is twenty four hours.

* * * * *